March 7, 1933.   F. W. GODSEY, JR   1,900,707
REGULATION OF ALTERNATING CURRENT CIRCUITS
Filed Jan. 17, 1931

Frank W. Godsey, Jr
INVENTOR

BY Janney, Blair & Curtis
ATTORNEYS

Patented Mar. 7, 1933

1,900,707

UNITED STATES PATENT OFFICE

FRANK W. GODSEY, JR., OF NEW HAVEN, CONNECTICUT, ASSIGNOR TO THE SAFETY CAR HEATING & LIGHTING COMPANY, A CORPORATION OF NEW JERSEY

REGULATION OF ALTERNATING CURRENT CIRCUITS

Application filed January 17, 1931. Serial No. 509,460.

This invention relates to the regulation of alternating current circuits.

One of the objects of this invention is to provide a simple, practical, and inexpensive system and apparatus for regulating a function such as the voltage or current, for example, of the alternating energy in an alternating current circuit. Another object is to provide an apparatus of the above-mentioned character that will be capable of embodiment in inexpensive and rugged physical form and that will be accurate and dependable in action. Another object is to provide a carbon pile operating or controlling apparatus responsive to a function of the energy in an alternating current circuit. Another object is to provide a system and apparatus of the above-mentioned character that will be well adapted to meet the varying conditions of hard practical use. Other objects will be in part obvious or in part pointed out hereinafter.

In my co-pending application Serial No. 387,052, filed August 19, 1929, entitled "Vehicle driving apparatus and system", I have disclosed but not claimed certain structural and functional features of the present invention and to that extent the present application is a continuation in part of my above-mentioned co-pending application.

The invention accordingly consists in the features of construction, combinations of elements, and arrangements of parts as will be exemplified in the structure to be hereinafter described and the scope of the application of which will be indicated in the following claims.

In the accompanying drawing in which are shown diagrammatically several of various possible embodiments of my invention.

Similar reference characters refer to similar parts throughout the several views of the drawing.

Figure 1:
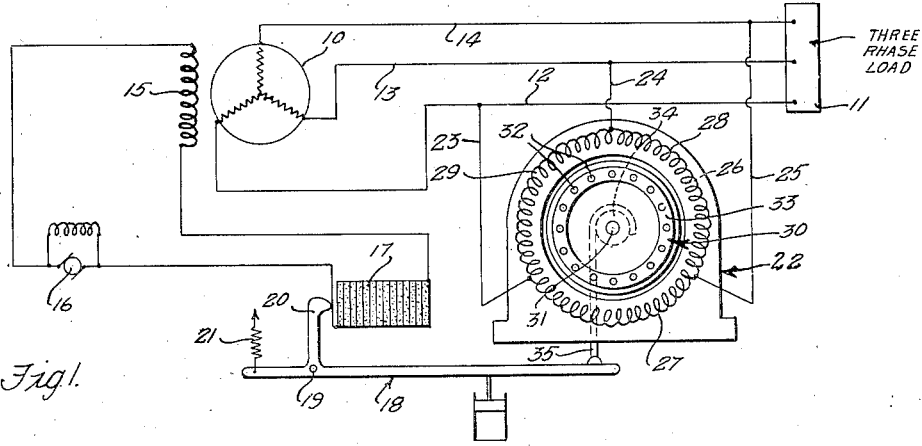
Figure 1 is a diagrammatic representation of a polyphase circuit and of the regulating apparatus therefor.

Referring now to the drawing and more particularly to Figure 1, in which I have shown a polyphase system of electrical distribution arranged for maintenance of constancy of voltage, I have shown at 10 a polyphase alternator of any suitable construction supplying polyphase energy to a load 11 through main line conductors 12—13—14; the alternator 10 has an exciting field 15 supplied with direct current from any suitable source, such as an exciter 16. A compressible carbon pile 17 is arranged in series with the alternator field 15 and the exciter 16 and hence variation in the pressure applied to carbon pile 17 causes like changes in the exciting current flowing from exciter 16 to the field winding 15, thus correspondingly to affect the potential across the polyphase conductors 12—13—14.

The pressure on the carbon pile 17 is controlled by a bell crank lever 18, pivoted at 19, having its one arm 20 engaging the free or unanchored end of the carbon pile 17; a spring 21 acts upon the lever 18 in a direction to swing the latter in clockwise direction, thus to increase the pressure on the carbon pile and decrease its resistance.

Opposing the action of spring 21 is an electro-magnetic device, generally indicated at 22 and connected by conductors 23—24—25 across the polyphase line 12—13—14 so as to be responsive to changes in potential across the latter.

The preferred construction of the device 22 includes what may be termed a stator 26 not unlike the stator of a polyphase induction motor and having suitably distributed in suitable slots (not shown) about the inside periphery thereof 3 windings diagrammatically indicated at 27, 28 and 29. These windings are shown in Figure 1 as being delta-connected and are connected, by conductors 23—24—25, across the polyphase line 12—13—14.

Windings 27—28—29 are so distributed throughout the inside peripheral pole face of the stator 26 which, by the way, is preferably laminated and hence made of suitable sheet iron having good magnetic properties, that, when energized with polyphase energy from the polyphase line, produce a rotating field, and for this purpose the windings and stator 26 may be constructed and arranged in any suitable manner, as is now well known in the polyphase induction motor art.

Movably mounted within the influence of this rotating magnetic field but constructed so that movement thereof does not affect appreciably the inductive reactance of the device 22, is a magnetic member 30 made up preferably of a series of disk-like laminations of sheet iron mounted upon a shaft 31 by which, through suitable bearings (not shown), member 30 is permitted only to rotate inside and with respect to the field structure 26. Preferably the magnetic member 30 has a diameter closely approaching the inside diameter of the magnetic core member 26 so that there is a relatively small air gap therebetween.

Extending axially through the magnetic member 30 is a series of apertures arranged preferably in a circle and relatively close to the periphery of member 30; through these openings extend the secondary windings of the device 22 and though these windings may be of any suitable form they are preferably in the form of relatively heavy bars of good conductivity, each extending through a single opening in the member 30. These conductors are indicated at 32 and their ends at each end of the rotary magnetic member 30 are connected together by conducting rings, one of which is shown in Figure 1 at 33. The secondary winding 32—33 is, of course, suitably insulated from the movable magnetic member 30.

Mounted upon the shaft 31 and rotatable with member 30 is a pulley-like member 34 about which is wrapped one end of a flexible band 35, the other end of which is secured to the bell crank lever 18.

When the windings 27—28—29 are energized from the polyphase line 12—13—14, the rotating field produced by these windings cuts the secondary winding 32—33, setting up in the latter currents which act in a direction to set up a field or flux opposing the flux of the rotating field, producing a torque tending to rotate the member 30 in clockwise direction and tending to wind up the band 35 in opposition to the pull of spring 21; this torque is proportional to the square of the voltage and the device 22 and spring 21 are so constructed or adapted that this torque effects a pull on band 35 exactly equal to the pull of spring 21 when the potential energizing the windings of device 22 is equal to that intended to be maintained constant in the polyphase circuit 12—13—14. When normal or intended potential exists in the polyphase circuit, the device 22 is in equilibrium with the spring 21, and the inductive reactance of device 22 has a certain value.

Should the potential in the polyphase circuit increase for any reason, the torque of device 20, proportional to the square of the potential, thus very rapidly increases, correspondingly rapidly increasing the pull exerted through band 35 and thus rapidly overcoming the pull of spring 21. Bell crank lever 18 is thus moved in counter-clockwise direction, the pressure on carbon pile 17 decreased and its resistance increased rapidly so as to in turn rapidly decrease the excitation current supplied to field winding 15 and thus quickly to reduce the potential of the alternator 10 to its normal value.

As rotary member 30 thus swings about the axis of shaft 31, no change in the reluctance of the magnetic circuit upon which windings 27—28—29 are effective takes place and no change in the inductive reactance of device 22, because of the physical and magnetic relation and construction of the stationary core 26 and the rotary core 30. The current energizing the windings 27—28—29 is thus substantially directly proportional to the potential of the polyphase line and, considering further the above-described action, as soon as the potential of the polyphase circuit has been restored to normal, through the action of carbon pile 17, the normal energizing current through windings 27—28—29 is restored and the same torque is exerted by device 22, and hence the same pull again exerted by band 35 sufficient exactly to counter-balance the pull of spring 21 which is constructed so that it exerts the same pull or tension throughout the operating range of the bell crank lever 18 and carbon pile 17.

Thus, equilibrium to re-established between the effective torque of device 22 and the pull of spring 21 and lever 18 and pile 17 are held in the position in which they had been moved, due to the above-assumed increase in potential above normal.

Should the potential of the polyphase circuit fall below the normal or intended value, the torque exerted by device 22, varying as the square of the potential, rapidly diminishes so that this equilibrium is disturbed and spring 21 becomes effective to increase the pressure on carbon pile 17 and cause an increase in the potential of the alternating energy supplied by alternator 10 to the load 11, this action being halted as soon as normal energizing current is restored in windings 27—28—29, this normal energizing current corresponding to normal potential across the polyphase circuit. Equilibrium between the torque of device 22 and the pull of spring 21 is re-established and the carbon pile and lever 18 are now held in a new position, in the position into which they were moved as a result of the decrease in the potential of the polyphase line.

Thus, the device 22 functions not only rapidly, since its torque is proportional to the square of the voltage, but also is made to exert a torque that is of constant value, irrespective of change in rotary position of the rotary member 30 as long as device 22 is energized by normal or intended potential, and due to this latter feature equilibrium or balance with respect to the constant pull of spring 21 may be achieved at any position of the movable parts throughout their operating range.

While the arrangement of Figure 1 is shown as achieving constancy of potential, it is to be understood that my invention is not to be limited to the maintenance of constancy of potential but that I may, for example, utilize the device 22 and its associated carbon pile for maintaining constancy of current flow in the polyphase circuit by an arrangement that will be more clearly described hereinafter with respect to Figure 3.

Figure 2:
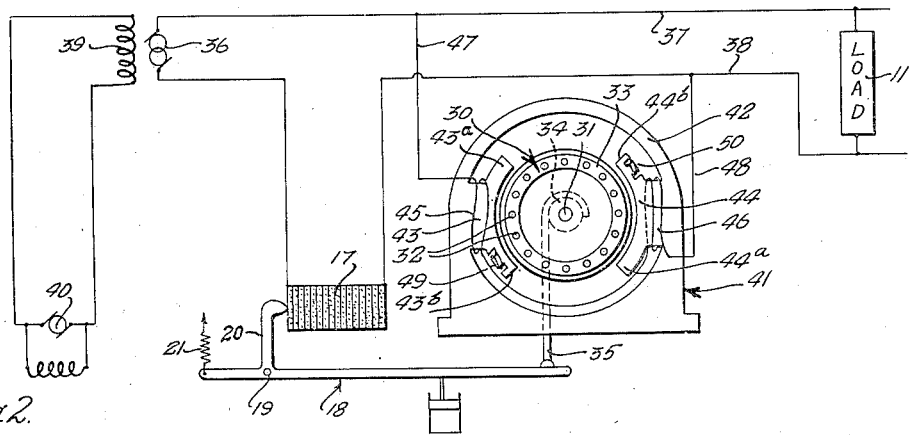
Figure 2 is a similar diagrammatic representation of a system and apparatus for regulation of a single-phase circuit.

Considering now the system and apparatus of Figure 2, the source 36 of alternating current is shown in the form of a single-phase alternator supplying polyphase energy to the load 11 through line conductors 37—38; the alternator 36 has an exciting field 39 supplied with exciting current from any suitable direct current source, such as an exciter generator 40. The carbon pile 17 is arranged to control or vary the voltage across the work circuit 37—38 and may be suitably positioned for this purpose and illustratively is inserted directly in one of the line conductors, such as in the line 38, being thus interposed between the source 36 and the load 11 and being given suitable load-carrying characteristics to suit this location in the circuit arrangement. It is to be understood, however, that this specific location of the carbon pile 17 is not intended by way of limitation but merely illustrative, insofar as certain broader features of my invention are concerned, of another possible way in which a carbon pile may be related to the circuit to be controlled and that I do not intend to preclude myself from otherwise positioning the carbon pile 17 as, for example, in the excitation circuit of the alternator and thus similarly to the position of the carbon pile 17 of Figure 1.

The resistance of the carbon pile 17, and hence the voltage drop therethrough, is controlled by the conjoint action of the spring 21, and an electromagnetic device generally indicated at 41 but which, as will be more clearly described hereinafter, has a number of features in common with the device 22 of Figure 1. Device 41 has a stationary frame 42 of suitable magnetic material, such as sheet iron laminations, and is provided illustratively with two poles 43 and 44 having respectively pole tips 43ª, 43ᵇ, 44ª and 44ᵇ.

Within the magnetic core or frame 42 and between the opposed poles 43 and 44 is suitably mounted a magnetic member which is preferably of a construction similar to the member 30 above-described in connection with Figure 1; accordingly, member 30 of device 41 has the same axially extending apertures through which are passed the conductors 32 short-circuited or connected together by rings 33, the device 30 being provided with a supporting shaft 31, a pulley 34, and a band member 35 wrapped around the pulley 34 and connected to lever 18. In its details of construction the member 30 of Figure 2 may be considered identical to the member 30 of Figure 1, and hence it is similarly designated in Figure 2.

Extending about the pole 43 is a winding 45 while pole 44 is provided with a similar winding 46, these two windings being connected in series across the work circuit 37—38 by conductors 47—48; thus the energization of windings 45 and 46 and the magneto-motive force produced by the windings in the magnetic circuit or circuits formed by the members 42 and 30 is made proportional to the voltage across the work circuit 37—38 across which the load 11 is connected, and constancy of the potential of which is to be maintained.

Pole tip 43ᵇ has suitably related to it a short-circuited winding 49, while the diametrically opposed pole tip 44ᵇ of pole 44 has related to it a substantially similar short-circuited winding 50.

Assuming that the intended alternating potential exists across the work circuit 37—38, the rotary member 30 exerts a torque in clockwise direction of such magnitude that the upward pull exerted by band 35 is exactly equal to the upward pull of spring 21, and hence lever 18 is held stationary and thus a value of resistance in carbon pile 17 is maintained as will cause a voltage drop therethrough sufficient to maintain the requisite difference between the potential at source 36 and the potential applied to the load 11. This torque is produced in part by the action of what is in effect a rotating magnetic field produced by the above-mentioned windings, even though windings 43 and 44 are energized by single-phase alternating current. This rotating field is produced by the coaction between the energized windings 43 and 44 and the short-circuited windings 49 and 50 on the pole tips.

More particularly, the short-circuited winding 39 on pole tip 43ᵇ has currents induced therein which act in such a direction as to oppose the growth of magnetic flux under pole tip 43ᵇ; hence, considering a half-cycle of the alternating current energizing winding 45, the magnetic flux rises to a maximum first in the unwound pole tip 43ᵃ (under the influence of the increasing instantaneous current of this half-cycle in winding 45) and thereafter rises to a maximum in the pole tip 43ᵇ, due to the delaying or opposing action of the short-circuited winding 49. A similar action takes place with respect to the pole piece 44 and its pole tips, and the resultant general effect is substantially that of a polyphase, specifically a two-phase, winding. Rotatable member 30 with its winding 32—33 is in the influence of this resultant rotating magnetic field, whence the torque-producing action of device 30 will now be clear in view of the detailed action above-described in connection with Figure 1.

Should the potential across the load 11 increase, the energizing current through windings 45—46 correspondingly increases, the current in the secondary windings 32—33 likewise increases and the torque, up to this point balancing the spring 21, increases, again proportionally to the square of the voltage across the load 11, whence rotary member 30 partakes of a rotary motion in clockwise direction, being thus enabled to overcome the pull of spring 21. This motion, relatively small, continues until the resistance of carbon pile 17 has been sufficiently increased in turn to increase the voltage drop across the carbon pile 17 to bring the voltage across conductors 37—38 back to its normal or intended value. As soon as this intended value is again achieved, the torque is again restored to a value where it is counter-balanced by spring 21 and the movable parts are thus held in a state of equilibrium and the new value of resistance in carbon pile 17 held fixed until a further change in the potential across the work circuit 37—38 takes place.

Should the potential across the load 11 fall below the intended value, a reversed action takes place, the relatively rapidly diminishing torque produced by device 41 being correspondingly rapidly overcome by the spring 21, thus to decrease the resistance of carbon pile 17 and the voltage drop therethrough, and thus to restore the voltage across conductors 37—38 quickly to normal or intended value.

Due to the above-described features of construction and action and particularly due to the symmetry of construction of the rotary device 30, any change in position of device 30 is without appreciable effect upon the inductive reactance of the device 40 and hence the latter functions accurately in response to changes in the potential of the single-phase energy supplied to load 11 and is inappreciably, if at all, affected by internal changes in impedance or in magnetic reluctance.

In the arrangements of Figures 1 and 2, the electromagnetic devices are shown and described as responsive to changes in voltage of the alternating energy supplied to the load and function, in coaction with the carbon pile and related parts, to maintain constancy of potential across the load. It is to be understood, however, that these possible embodiments of my invention are not to be limited to voltage regulation but that they may be utilized for regulating a function of the alternating energy other than the potential thereof. In Figure 3 I have shown a modified form of electromagnetic device and also have illustrated that device as responsive to current changes in the work circuit in order to illustrate how the arrangements of Figures 1 and 2 may be caused to regulate for constancy of current in the circuit.

Figure 3:
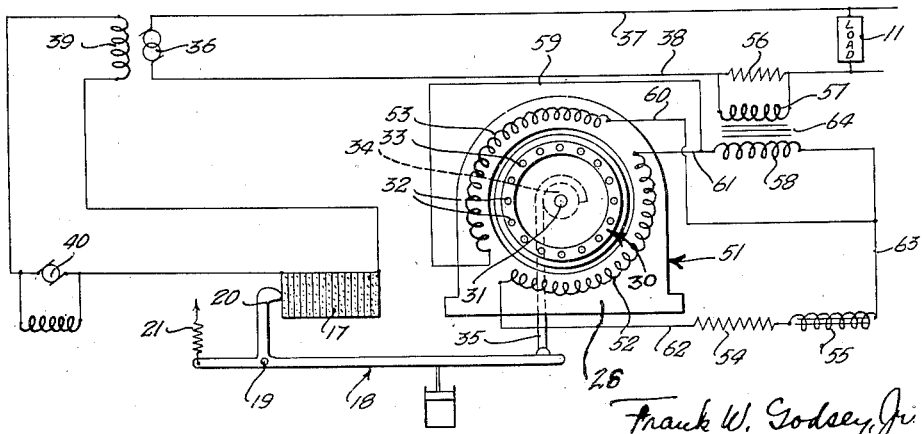
Figure 3 is a diagrammatic representation like that of Figure 2 but illustrating a possible modified embodiment.

In Figure 3 the source of alternating energy is again shown in the form of a single-phase alternator 36 having a field winding 39 supplied with energy from a suitable direct current exciter generator 40; alternator current 36 applies single-phase alternating energy to the load 11 through alternating conductors 37—38. The electromagnetic device generally indicated at 51 coacts with the spring 21 to control the resistance of the carbon pile 17 which may be positioned at any suitable point in the circuit and illustratively I have shown it, in Figure 3, in series with the field 39 of the alternator 36 and the exciter 40 so that it controls the excitation of alternator 36 and hence the output thereof.

Device 51 has a stationary field structure or stator 26 which may be similar in construction to the magnetic frame member 26 of the device 22 of Figure 1, but instead of having three windings distributed about its pole face (as in Figure 1) the magnetic member 26 of device 51 has two windings 52 and 53 distributed about its pole face but electrically displaced by a suitable angle. Windings 52—53 are energized with single-phase energy but the current in one winding is caused to be displaced by a suitable phase angle from the current in the other winding so as to achieve the action of a rotating magnetic field. Such relative phase displacement of the currents in these two windings may be achieved by inserting in the circuit of one winding, such as winding 52, a suitable impedance which may, for example, take the form of a resistance 54 and an inductance 55, both of suitable value.

Windings 52 and 53 are otherwise connected in parallel and made to be responsive to the function of the single-phase alternating current energy that is to be regulated or maintained constant and, as above noted, in the arrangement of Figure 3 the device 51 is to be made responsive to departures from a certain value of alternating current flow in the work circuit 37—38.

Accordingly, and as illustrative of a possible way of making the electromagnetic device responsive to current changes, I insert in the work circuit 37—38, as in one of the line conductors 38 the primary winding 57 of a suitable current transformer, the relatively high voltage winding 58 of which, related with the primary winding 57 to a suitable magnetic core indicated at 59, has connected to it the windings 52 and 53. Thus winding 53 is bridged across transformer winding 58 by conductors 59 and 60 while the circuit of winding 52 extends from one terminal of transformer winding 58, conductor 61, winding 52, conductor 62, resistance 54, inductance 55, and thence by way of conductor 63 to the other terminal of transformer winding 58. Changes in current through the primary 57 cause like changes in the flux in the transformer magnetic circuit 64 and hence in the potential of secondary winding 58 which energizes the windings 52—53 of device 51.

The parts are so adjusted or designed that, when the intended value of current is flowing through primary 57 and hence to the load 11, the rotating field produced by the windings 52—53, in coaction with the secondary winding 32—33 of the rotary member 30, produces a torque effective to exert a pull on lever 18 through band 35 that is exactly equal to the pull of spring 21, and the parts are thus held in static equilibrium as long as this intended value of current continues to flow to the load 11.

If desired, a low resistance shunt 56 may be shunted about the primary or current winding 57.

Should, however, the current change for any reason, such as, for example, due to a change in speed of the alternator, which, throughout the various arrangements above-described may be considered as operating at a constant speed, the torque of device 51, proportional to the square of the voltage of secondary winding 58, is promptly changed to correct the change in current in the work circuit.

For example, should the current increase, the potential drop across primary 57 correspondingly increases and so also does the output voltage of transformer secondary 58. The energization of windings 52 and 53 correspondingly increases whereupon the torque produced through rotary or secondary device 30 rapidly increases, overcoming the pull of spring 21 and thus rapidly increasing the resistance of carbon pile 17 to correspondingly reduce the voltage of alternator 36 to bring the current supplied to the load 11 back to normal. As soon as this normal value of current is re-established, the torque produced by device 51 is again restored to normal, exactly counter-balancing spring 21 and thus holding the carbon pile and associated movable parts in the position into which they had been moved. Should the current supplied to the load 11 fall below this intended value, a reverse action takes place. Each time that the current is brought back to normal value and irrespective of the position of device 30 when its rotary movement ceases, static equilibrium between the electromagnetic device and the spring 21 is re-established and there are no changes in internal reactance, impedance, or magnetic reluctance to affect this action even though the position of rotary device 30 has been changed.

It will thus be seen that there has been provided in this invention a system and apparatus in which the various objects hereinabove pointed out, together with many thoroughly practical advantages, are successfully achieved. It will be seen that though the electromagnetic device is energized directly by alternating current, and even though its magnetic circuit contains a movable part, movement of this movable part is ineffective to affect the energization of this winding of the device and that such energization is constantly maintained exactly dependent upon the function of the alternating current energy, be it polyphase or single-phase that is to be regulated. Moreover, it will be seen that the apparatus is of a thoroughly practical nature and is well adapted to meet the varying conditions of hard practical use.

As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

1. In apparatus of the character described, in combination, a source of alternating current, a load supplied therefrom, a carbon pile for affecting a function of the energy supplied to said load, and means for controlling said carbon pile, said means including a spring acting in one direction, a rotary magnetic member opposing the action of said spring and having a winding thereon, and means energized by alternating current and responsive to changes in said function for producing a rotating magnetic field affecting the rotary position of said rotary member, said rotary member being constructed so that change in its rotary position has substantially no appreciable effect upon the current energizing said last-mentioned means.

2. In apparatus of the character described, in combination, a source of alternating current, a load supplied with energy therefrom, and means for regulating a function of the energy supplied to said load, said regulating means including a carbon pile, a movable magnetic member for affecting said carbon pile, a stationary magnetic member with which said movable member coacts, and a winding energized by alternating current and responsive to changes in said function and related to said stationary member, said two members being constructed and related to each other so that change in position of said movable member is unaccompanied by appreciable changes in magnetic reluctance of the magnetic circuit formed by said two members.

3. In apparatus of the character described, in combination, a source of alternating current, a load supplied with energy therefrom, and means for regulating a function of the energy supplied to said load, said regulating means including a carbon pile, a movable magnetic member for affecting said carbon pile, a stationary magnetic member with which said movable member coacts, and a winding energized by alternating current and responsive to changes in said function and related to said stationary member, said two members being constructed and arranged so that the impedance of said winding remains substantially constant throughout the range of change in position of said movable member with respect to said stationary member.

4. In apparatus of the character described, in combination, a carbon pile and means for controlling the pressure on said carbon pile, said means including two relatively movable members of magnetic material, a winding energized by alternating current for setting up a magnetic flux through the magnetic circuit formed by said two members, a winding on the other of said members adapted to have current induced therein by said flux, said two members being constructed so that the force exerted by said movable member remains the same in any position throughout its range of movement for a given energization of said first-mentioned winding.

5. In apparatus of the character described, in combination, a carbon pile and means for controlling the pressure on said carbon pile, said means including two relatively movable members of magnetic material, a winding energized by alternating current for setting up a magnetic flux through the magnetic circuit formed by said two members, said members being constructed and shaped so that, for a given energization of said winding, the flux produced by said winding holds said members in any relative position within the range of relative movement therebetween.

6. In apparatus of the character described, in combination, a carbon pile and means for controlling the pressure on said carbon pile, said means including two relatively movable members of magnetic material, a winding energized by alternating current for setting up a magnetic flux through the magnetic circuit formed by said two members, said two members being shaped so that the inductive reactance of the circuit of said winding is free from change throughout the range of relative movement between said members.

7. In apparatus of the character described, in combination, a carbon pile and means for controlling the pressure on said carbon pile, said means including a rotatably mounted member of magnetic material adapted upon movement about its axis to vary the pressure on said carbon pile, a stationary member of magnetic material and within which said rotary member is rotatable, a short-circuited winding on one of said members, and windings on the other of said members adapted when energized by alternating current to produce a rotating magnetic field and to induce current in said other winding.

8. In apparatus of the character described, in combination, a carbon pile and means for controlling the pressure on said carbon pile, said means including a rotatably mounted member of magnetic material adapted upon movement about its axis to vary the pressure on said carbon pile, electromagnetic means adapted to be energized by alternating current to produce rotary movement of said rotary member upon said alternating current departing from a certain value, said rotary member being constructed symmetrically so that change in its position is unaccompanied by change in reluctance to the flux produced by said electromagnetic means.

9. In apparatus of the character described, in combination, a source of alternating current, a load supplied thereby, a carbon pile for controlling a function of the alternating current energy supplied to said load, and mechanism for controlling the pressure on said carbon pile, said mechanism including polyphase windings responsive to changes in a function of the energy supplied to said load, and a movable core of magnetic material within the field of said polyphase windings, said core being mechanically and electrically symmetrical.

10. In apparatus of the character described, in combination, a source of alternating current, a load supplied thereby, a carbon pile for controlling a function of the alternating current energy supplied to said load, and mechanism for controlling the pressure on said carbon pile, said mechanism including two members of magnetic material, one of which is movable with respect to the other and the movement of which affects the pressure on said carbon pile, and a winding responsive to changes in said function for setting up a magnetic flux through said two members, said movable member being mechanically and electrically symmetrical.

11. In apparatus of the character described, in combination, a source of alternating current, a load supplied thereby, a carbon pile for controlling a function of the alternating current energy supplied to said load, and mechanism for controlling the pressure on said carbon pile, said mechanism including a magnetic circuit made up of a fixed part and a movable part so shaped that movement of said movable part is unaccompanied by change in reluctance of said magnetic circuit, means responsive to movement of said movable part for affecting the pressure on said carbon pile, and a winding responsive to changes in said function for setting up magnetic flux in said magnetic circuit.

12. In apparatus of the character described, in combination, a source of alternating current, a load supplied thereby, a carbon pile for controlling a function of the alternating current energy supplied to said load, and mechanism for controlling the pressure on said carbon pile, said mechanism including a magnetic circuit made up of two members, one of which is movable with respect to the other, means responsive to movement of said movable member for affecting the pressure on said carbon pile, a winding responsive to changes in said function for producing magnetic flux in said magnetic circuit, said magnetic circuit having the characteristic that the force tending to cause movement of said movable part is the same for a given energization of said winding for any position of said movable part within its range of movement without affecting the magnetic reluctance of said magnetic circuit.

13. In apparatus of the character described, in combination, a source of alternating current, a load supplied thereby, a carbon pile for controlling a function of the alternating current energy supplied to said load, and mechanism for controlling the pressure on said carbon pile, said mechanism including means responsive to changes in said function for producing an alternating magnetic field, and a movable magnetic member subjected to the influence of said field and connected to affect the pressure on said carbon pile and constructed so that its movement is unaccompanied by changes in magnetic reluctance in the path of said flux.

14. In apparatus of the character described, in combination, a source of alternating current, a load supplied thereby, regulating means for controlling a function of the alternating current enargy supplied to said load and including a movable device offering a substantially constant resistance to movement throughout its range of movement, and electromagnetic means energized by alternating current that partakes of changes with changes in said function for opposing said device, said last-mentioned means having the characteristic of exerting a force equal to that of said device throughout the range of movement of said device for a fixed value of energizing alternating current without affecting the impedance of said electromagnetic means.

15. In apparatus of the character described, in combination, a source of alternating current, a load supplied thereby, regulating means for controlling a function of the alternating current energy supplied to said load and including a movable device offering a substantially constant resistance to movement throughout its range of movement, and electromagnetic means energized by alternating current that changes with changes in said function and having a movable magnetic member connected to oppose said device, said electromagnetic means and said movable member having the characteristic of exerting the same force through said movable magnetic member throughout the range of movement of the latter for a given value of energizing alternating current without changing the impedance of the circuit of said electromagnetic means.

16. In a regulating system, in combination, a source of alternating current, a load supplied thereby, a carbon pile for controlling a function of the alternating current energy supplied to said load and having the inherent characteristic of requiring the application thereto of a substantially steady force, means exerting upon said pile a substantially steady force in one direction, and electromagnetic mechanism for opposing said means, said mechanism including a core and windings thereon responsive to changes in the said function and coacting to produce a rotating magnetic field and a rotatable core of magnetic material within said rotating magnetic field and connected to affect said carbon pile, said rotatable core being mechanically and electrically symmetrical whereby change in its rotary position is unaccompanied by change in impedance of said windings.

17. In apparatus of the character described, in combination, a dynamo electric machine, means including a compressible carbon pile for controlling the excitation of said machine, means for controlling the pressure on said carbon pile including a rotatable element and means acting in response to rotation of said element for changing the pressure on said carbon pile and a polyphase winding associated with said rotatable element to exert thereon a torque varying with the energization of said polyphase winding, and means relating said polyphase winding to be responsive to an operating characteristic of said dynamo electric machine.

In testimony whereof, I have signed my name to this specification this 13th day of January, 1931.

FRANK W. GODSEY, Jr.